(12) United States Patent
Aggarwal et al.

(10) Patent No.: US 12,008,659 B1
(45) Date of Patent: *Jun. 11, 2024

(54) EFFICIENT AND ACCURATE MATCHING OF EXPENSES TO SOFTWARE IN A SAAS MANAGEMENT PLATFORM

(71) Applicant: Productiv, Inc., Palo Alto, CA (US)

(72) Inventors: Ashish Aggarwal, Los Altos Hills, CA (US); Shantanu Kumar, San Francisco, CA (US); Gaurav Sood, Redmond, WA (US); Sharan Jhangiani, Bellevue, WA (US)

(73) Assignee: Productiv, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,673

(22) Filed: Jan. 31, 2023

Related U.S. Application Data

(63) Continuation of application No. 18/162,641, filed on Jan. 31, 2023.

(51) Int. Cl.
  *G06Q 40/12* (2023.01)
  *G06Q 10/105* (2023.01)

(52) U.S. Cl.
  CPC .......... *G06Q 40/12* (2013.12); *G06Q 10/105* (2013.01)

(58) Field of Classification Search
  CPC .............................. G06Q 40/12; G06Q 10/105
  See application file for complete search history.

(56) References Cited

U.S. PATENT DOCUMENTS

| | | | | |
|---|---|---|---|---|
| 2004/0167788 A1* | 8/2004 | Birimisa | ................ | G06Q 30/02 705/347 |
| 2006/0031112 A1* | 2/2006 | Barth | ..................... | G16H 40/20 705/2 |
| 2008/0177643 A1* | 7/2008 | Matthews | .............. | G06Q 30/04 705/30 |

(Continued)

FOREIGN PATENT DOCUMENTS

| CN | 108268472 A | * | 7/2018 |
|---|---|---|---|
| CN | 112017020 A | * | 12/2020 |

OTHER PUBLICATIONS

Belkin "It's Time to Simplify Employee Expense Management with Data Integration. Here's How." (2023) (https://www.jitterbit.com/blog/employee-expense-management-data-integration/) (Year: 2023).*

*Primary Examiner* — Sujay Koneru
(74) *Attorney, Agent, or Firm* — Penilla IP, APC

(57) ABSTRACT

A non-transitory computer-readable medium having program instructions for a method implemented in a Software as a Service (SaaS) management platform (SMP) is provided, including: receiving a plurality of expense records for a customer organization, wherein each one of the plurality of expense records identifies a user, a vendor, and an amount spent; using a first machine learning model to analyze the plurality of expense records and determine which ones of the expense records represent software purchases; using a second machine learning model to analyze the expense records that are determined to represent software purchases, and identify software titles that the software purchases are for; surfacing the expense records that represent software purchases, in association with their respective identified software titles, through a user interface of the SMP for the customer organization.

19 Claims, 8 Drawing Sheets

(56) References Cited

U.S. PATENT DOCUMENTS

| | | | |
|---|---|---|---|
| 2010/0049573 A1* | 2/2010 | Kantorova | G06F 21/6218 705/50 |
| 2013/0024229 A1* | 1/2013 | Agrawal | G06Q 10/105 705/7.14 |
| 2013/0080199 A1* | 3/2013 | Wenzel | G06Q 10/06 705/7.11 |
| 2013/0267249 A1* | 10/2013 | Rosenberg | H04L 67/52 455/456.3 |
| 2016/0132830 A1* | 5/2016 | Zhang | G06F 16/24578 705/320 |
| 2019/0122153 A1* | 4/2019 | Meharwade | G06Q 10/06313 |
| 2020/0034772 A1* | 1/2020 | Balan | G06Q 10/06375 |
| 2020/0073979 A1* | 3/2020 | Bandyopadhyay | H04L 67/10 |
| 2020/0153703 A1* | 5/2020 | Peterkin | G06F 8/60 |
| 2020/0166942 A1* | 5/2020 | Kwatra | G06F 9/4881 |
| 2020/0169478 A1* | 5/2020 | Joshi | G06Q 50/10 |
| 2020/0349134 A1* | 11/2020 | Peterkin | G06F 3/0482 |
| 2021/0084670 A1* | 3/2021 | Chauhan | H04L 65/80 |
| 2021/0256097 A1* | 8/2021 | Jayaraman | G06N 5/046 |
| 2021/0342723 A1* | 11/2021 | Rao | G06F 16/285 |
| 2021/0350202 A1* | 11/2021 | Zachariah | G06Q 30/02 |
| 2023/0145484 A1* | 5/2023 | Jain | G06F 9/45558 718/1 |

* cited by examiner

App Portfolio

Provides an overview of your organization's entire app portfolio

Apps
104
of 299 total
From 241 vendors >

Contract Annual Spend
N/A
of 28.4M
Upload contracts to show

Past 12 Month Spend
$4.13M
of 12.8M total

| App | App Status | Active Licenses | Category | Provisioned Lic. | Data Sources | Contract Annual Spend | $Past 12 months | Discovered App |
|---|---|---|---|---|---|---|---|---|
| Motion | In Review | 1,387 | Other Content Management Apps | *1,387 | ○○○●●○ | | $78 | Yes |
| Figma | Not Approved | 1,367 | UX Design | *1,387 | ○○○●○○ | | $4,776 | Yes |
| Zapier | Not Approved | 631 | Other IT Apps | *631 | ○○○●○○ | | $11,630 | Yes |
| Video | Not Approved | 627 | Other Collaboration Apps | *627 | ○○○●○○ | | $900 | Yes |
| Udemy | Not Approved | 623 | Learning Apps | *623 | ○○○●○○ | | $12 | Yes |
| Intercom | In Review | 125 | Other Customer Services | *125 | ○○●●○○ | | $24,877 | Yes |
| A Cloud Guru | In Review | | Learning Apps | | ○○○●○○ | | $98 | Yes |
| 1Password | In Review | | Passwords Manager | | ○○○●○○ | | $10,984 | Yes |
| ADP Workforce | None | | HR Management Suites | | ○○○●○○ | | $126,856 | Yes |
| Activeinbox | None | | Other Content Management Apps | | ○○○●○○ | | $9,990 | Yes |
| Adobe | Approved | | Other Marketing Apps | | ○○○●○○ | | $475,220 | Yes |
| Air Squirrels | None | | Other IT Apps | | ○○○●○○ | | $15 | Yes |
| Airtable | None | | Spreadsheet & Presentation | | ○○○●○○ | | $6,363 | Yes |
| Arcentry | None | | Other Content Management Apps | | ○○○●○○ | | $10 | Yes |
| Atlassian cloud | Approved | | Cloud Infrastructure Apps | | ○○○●○○ | | $400,965 | Yes |
| Avatax | Not Approved | | Accounting & Budgeting | | ○○○●○○ | | $46,690 | Yes |
| Azure Active | None | | Identity & Access Management | | ○○○●○○ | | $200,008 | Yes |
| Bill.com | None | | Accounts Payable & Receivable | | ○○○●○○ | | $4,205 | Yes |
| Boomerang | None | | Other Office Apps | | ○○○●○○ | | $105 | Yes |
| BrowserStack | None | | Testing and Automation | | ○○○●○○ | | $6,616 | Yes |
| Buffer | None | | Social Media | | ○○○●○○ | | $2,121 | Yes |
| Bugsnag | None | | Bug Tracking | | ○○○●○○ | | $1,673 | Yes |

FIG. 6

SalesApp

Overview  Teams  Features  Recommendation  Automation  Contracts  Past Spend

Past 12 Months Summary
Nov 28, 2021 - Nov 17, 2022

$2,864,594 Spend

| Payments | Expenses | Details |
|---|---|---|
| $485,908 | $2,378,686 | Data Sources |
| 23 Payments | 59 Expenses Filed from users | ☐ Finance ☐ NetSuite |

All past spend — 704

Monthly spend  ● Expenses  Expensing users

View 6M  12M > 1YR ☐

Individual Spend Reports — 706

| Spend Date | Supplier | Merchant | Type | Source | Category | Description | Expensing ID | Team | Amount | Cost center | PO Number |
|---|---|---|---|---|---|---|---|---|---|---|---|
| Nov 22, 2022 | Sales | Sales | Payment | Spend.csv | Software License | Licenses for Sales | 65425 | Not found in HR | $6,322 | 700: sales -- 720:Enterprise | 46358 |
| Nov 22, 2022 | Sales | Sales | Expense Mgmt | Netsuite | Software | | John@productivdemo.com | Product | $164,209 | | |
| Nov 21, 2022 | Sales | Sales | Expense Mgmt | Netsuite | Software | | Jane@productivdemo.com | Services | $1,262 | | |
| Nov 21, 2022 | Sales | Sales | Expense Mgmt | Netsuite | Software | | Joe@productivdemo.com | Product | $164,209 | | |
| Nov 20, 2022 | Sales | Sales | Expense Mgmt | Netsuite | Software | | John@productivdemo.com | Services | $1,262 | | |
| Nov 13, 2022 | Sales | Sales | Expense Mgmt | Netsuite | Software | | John@productivdemo.com | Services | $1,282 | | |
| Nov 22, 2022 | Sales | Sales | Expense Mgmt | Netsuite | Software | | John@productivdemo.com | Services | $1,240 | | |
| Nov 07, 2022 | Sales | Sales | Payment | Spend.csv | Software License | Renewal of Sales Licenses | Jane@productivdemo.com | Not found in HR | $3,225 | 700: sales -- 770:SMB | 58465 |
| Nov 07, 2022 | Sales | Sales | Expense Mgmt | Netsuite | Software | | Jane@productivdemo.com | Services | $1,240 | | |
| Nov 06, 2022 | Sales | Sales | Expense Mgmt | Netsuite | Software | | Joe@productivdemo.com | Services | $1,199 | | |
| Oct 27, 2022 | Sales | Sales | Expense Mgmt | Netsuite | Software | | Joe@productivdemo.com | Services | $1,199 | | |
| Oct 27, 2022 | Sales | Sales | Expense Mgmt | Netsuite | Software | | Jane@productivdemo.com | Services | $1,199 | | |
| Oct 23, 2022 | Sales | Sales | Expense Mgmt | Netsuite | Software | | Joe@productivdemo.com | Services | $78,732 | | |
| Oct 23, 2022 | Sales | Sales | Expense Mgmt | Netsuite | Software | | Jane@productivdemo.com | Services | $78,732 | | |
| Oct 18, 2022 | Sales | Sales | Expense Mgmt | Netsuite | Software | | Jane@productivdemo.com | Services | $1,199 | | |

FIG. 7

Review Hidden Merchants

Unknown Merchants Merchants that are not SaaS

800

Some spend data is not shown because it is either unknown to the productiv catalog to be SaaS. To include this spend, map the merchant to a known SaaS app or vendor.

If you have an app that you would like to be considered by Productiv's catalog, please contact support.

Instructions for how to map spend

Productiv has an extensive directory of standardized application details. Uploaded app names will be replaced with standard app names.
263 unmapped names remaining

[🔍 Filter Merchants]    [Request New App]

| Merchant | Mapped app name | Total Spend | Data Source | Most recent upload date | |
|---|---|---|---|---|---|
| Lightboard, Inc. | 🔍 Search | $20,250 | Spend .csv Upload | Oct 11, 2022 | Hide Merchant |
| CLICKEDIN INC. | 🔍 Search | $2,994 | Expensify Connector | Mar 07, 2022 | Hide Merchant |
| www.thuzio.com | 🔍 Search | $1,500 | Spend .csv Upload | Sep 09, 2022 | Hide Merchant |
| Tcd | 🔍 Search | $1,100 | Spend .csv Upload | Nov 01, 2022 | Hide Merchant |

FIG. 8

EFFICIENT AND ACCURATE MATCHING OF EXPENSES TO SOFTWARE IN A SAAS MANAGEMENT PLATFORM

CROSS-REFERENCE TO RELATED APPLICATIONS

This application is a continuation of, and claims priority to, U.S. application Ser. No. 18/162,641, filed Jan. 31, 2023, entitled "Efficient and Accurate Matching of Expenses to Software in a SaaS Management Platform," the disclosure of which is incorporated by reference herein.

BACKGROUND OF THE INVENTION

Software as a service (SaaS) is a software distribution model in which applications are cloud-hosted and made available to end users over the Internet. This is advantageous for the end users in that a SaaS application is provided "as a service," such that the end users are not required to host or maintain the application, and are enabled to access the application from practically anywhere with sufficient network connectivity. However, the rise of SaaS adoption amongst corporate entities also presents problems from a management perspective. As a given corporate entity may subscribe to many different SaaS applications, efficient SaaS management becomes increasingly difficult as a result.

It is in this context that implementations of the disclosure arise.

SUMMARY OF THE INVENTION

Implementations of the present disclosure include methods and systems for efficient and accurate matching of expense data to software in a SaaS management platform.

In some implementations, a method implemented in a Software as a Service (SaaS) management platform (SMP) is provided, the SMP implemented in a cloud resource having at least one processor and at least one storage device, the method including the following operations: receiving a plurality of expense records for a customer organization, wherein each one of the plurality of expense records identifies a user, a vendor, and an amount spent; using a first machine learning model to analyze the plurality of expense records and determine which ones of the expense records represent software purchases; using a second machine learning model to analyze the expense records that are determined to represent software purchases, and identify software titles that the software purchases are for; surfacing the expense records that represent software purchases, in association with their respective identified software titles, through a user interface of the SMP for the customer organization.

In some implementations, the method further includes: accessing human resources (HR) data of the users respectively identified by the plurality of expense records; wherein using the first or the second machine learning model is configured to analyze, for a given expense record, the HR data of the user identified by the given expense record.

In some implementations, the HR data of the user identified by the given expense record includes one or more of a role, team, or a location of the user.

In some implementations, accessing the HR data of the users includes accessing an application programming interface (API) of an HR SaaS application.

In some implementations, the method further includes: accessing application engagement data of the users respectively identified by the plurality of expense records; wherein using the first or the second machine learning model is configured to analyze, for a given expense record, the application engagement data of the user identified by the given expense record.

In some implementations, the application engagement data of the user identified by the given expense record identifies one or more applications that the user has interacted with.

In some implementations, accessing the application engagement data of the users includes accessing an API of a single sign on (SSO) service or a cloud access security broker (CASB).

In some implementations, receiving the expense records includes accessing an API of an expense management SaaS application.

In some implementations, the first or the second machine learning model is defined by a neural network classifier trained using labeled training data.

In some implementations, using the second machine learning model is configured to access an application catalog service that maintains a directory of software applications.

In some implementations, surfacing the expense records that represent software purchases through the user interface of the SMP includes, for a given software title, listing data from the expense records that represent software purchases for the given software title.

In some implementations, surfacing the expense records that represent software purchases through the user interface of the SMP includes, for a given software title, adding the amounts spent, of expense records representing software purchases of the given software title, to a total spend for the software title that is displayed in the user interface.

In some implementations, a method implemented in a Software as a Service (SaaS) management platform (SMP) is provided, the SMP implemented in a cloud resource having at least one processor and at least one storage device, the method including the following operations: receiving a plurality of expense records for a customer organization, wherein each one of the plurality of expense records identifies a user, a vendor, and an amount spent; using a first machine learning model to analyze the plurality of expense records and determine which ones of the expense records represent software purchases; using a second machine learning model to analyze the expense records that are determined to represent software purchases, and for each expense record representing a software purchase, either identify a software title that the software purchase is for, or determine that a software title cannot be identified that the software purchase is for; surfacing the expense records that represent software purchases through a user interface of the SMP for the customer organization.

Other aspects and advantages of the disclosure will become apparent from the following detailed description, taken in conjunction with the accompanying drawings, illustrating by way of example the principles of the disclosure.

BRIEF DESCRIPTION OF DRAWINGS

The disclosure may be better understood by reference to the following description taken in conjunction with the accompanying drawings in which:

FIG. 6 illustrates a user interface showing an app portfolio listing for a customer of an SMP, in accordance with implementations of the disclosure.

FIG. 7 illustrates a user interface showing expense records which have been resolved to a given application, in accordance with implementations of the disclosure.

FIG. 8 illustrates a user interface showing expense records identified as software spend, but not resolved to specific software applications, in accordance with implementations of the disclosure.

DETAILED DESCRIPTION OF THE INVENTION

Figure 1:
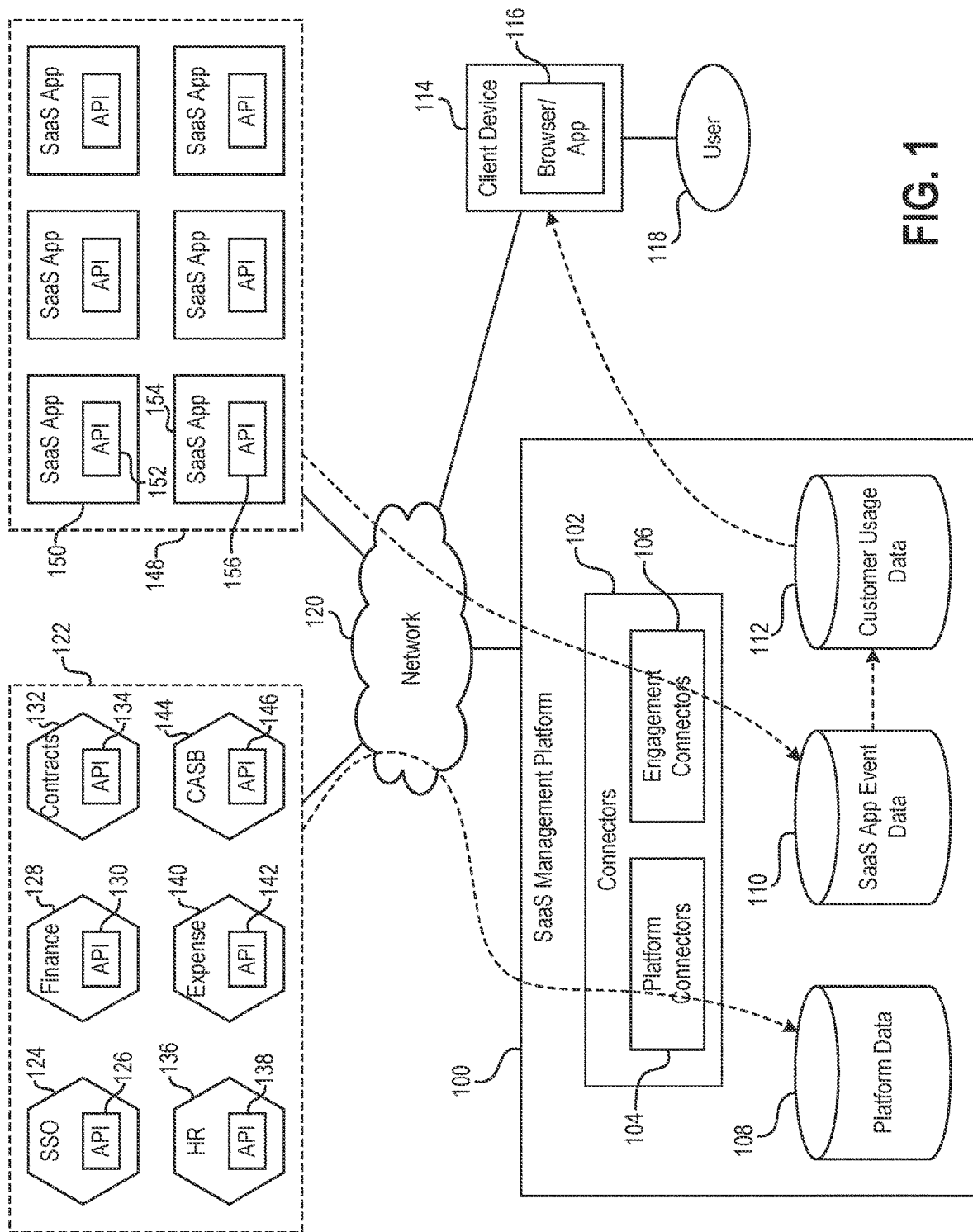
FIG. 1 conceptually illustrates a SaaS management platform and its connection to SaaS applications, in accordance with implementations of the disclosure.

The following implementations of the present disclosure provide methods and systems for efficient and accurate matching of expense data to software in a SaaS management platform (SMP).

An SMP as described herein provides powerful tools for companies to gain insights into their SaaS application usage and spend. Many companies allow employees to expense various things, such as meals, travel, and also software. Hence, expense data can be a rich source of data for discovering potential spend on software applications, and can be especially useful for discovering applications which are not already being managed or tracked through other systems (e.g. SSO). Employee expenses are generally filed and stored using a software solution (e.g., Expensify, Concur, TripActions, etc.). An SMP may obtain expense data from the expense software provider, but it is a challenge to efficiently determine which expenses are for software purchases. There are a very large number of expenses (e.g. millions of expense reports from customers of the SMP), which do not clearly identify which ones are for software.

Existing expense resolution systems—systems designed to map expenses to the appropriate product—are built using simple rules for matching strings, e.g., check if the words in the description of the expense are the same as in a database of product descriptions. Conventional expense resolution systems also provide ways to search expenses using string similarity and manually map those expenses to a particular item in the inventory. While these systems provide some capability, their accuracy is generally low (e.g. generating false positives—mistaking non-software as software and mapping to the wrong software, and false negatives—mistaking software as non-software) for a variety of reasons.

It is difficult to disambiguate software-related terms from non-software related terms. The number of software applications with names similar to non-software entities is large, e.g., "catch" might refer to an app or a restaurant. Further, the number of software titles with similar names is large. For instance, at the time of this writing, a search for "apollo" on G2™ (a software marketplace and review site) yields over 20 software applications with that name. Software titles with the word "symphony" number well over 30.

Moreover, since expenses are entered by humans, the description of expenses can be incomplete and full of errors. This means that existing systems often must use a key word (e.g. "symphony") absent other distinguishing words while attempting to match the correct app out of a potentially high number of possible apps (e.g. 30+ apps with "symphony" in their name).

Existing systems do not leverage (and may not even have access to) data sources that can help disambiguate superficial string matches.

The number of software applications in the world is very large—numbering in the millions. This means that brute force matching techniques are extremely resource intensive to perform, and cannot be part of real-time systems without incurring significant costs.

In addition to these failings, which make the overall accuracy of conventional systems low and the cost high, conventional systems also require extensive engineering input to continue to maintain their sets of rules.

In view of these challenges, implementations of the present disclosure provide for efficient and accurate matching of expenses submitted to employers for reimbursement to software applications. This generally entails acquiring supplementary information about the person who is expensing purchases from additional systems, deriving additional information about the expenses, and using machine learning to match in a way that balances efficiency and accuracy. The disambiguation problem is solved in two steps—separating non-software expenses from software expenses, and for those identified as software expenses, then matching to the correct software application title. Accordingly, the systems and methods of the present disclosure enable an SMP obtaining millions of expenses from its customers to efficiently and accurately determine whether or not an expense is for software and if it is for software, which software it is for.

It will be obvious, however, to one skilled in the art, that the present disclosure may be practiced without some or all of the specific details presently described. In other instances, well-known process operations have not been described in detail in order not to obscure the present implementations.

Implementations of the present disclosure are implemented using a SaaS management platform (SMP). Broadly speaking, a SaaS management platform connects to, and obtains data from, a given customer's portfolio of SaaS applications, and provides analysis and insights relating to the customer's usage of their SaaS applications. One example of a SaaS management platform is Productiv™ provided by Productiv, Inc. For a fuller understanding of the present disclosure, an example of a SaaS management platform is herein described.

FIG. 1 conceptually illustrates a SaaS management platform and its connection to SaaS applications, in accordance with implementations of the disclosure.

In the illustrated implementation, a SaaS management platform 100 includes connectors 102 that are configured to obtain data from various applications/platforms, typically by calling their exposed Application Programming Interfaces (APIs). Connectors 102 are further distinguished between platform connectors 104 and engagement connectors 106.

Platform connectors 104 are configured to obtain data from platform applications/services 122. Broadly speaking, platform applications 122 provide contextual information to identify, enable access, and understand customer usage context of the SaaS applications which the customer is seeking to manage via the SMP 100. It will be appreciated that platform applications may themselves be SaaS applications, but are distinguished from other SaaS applications in the present disclosure as they are used to provide information about the customer that is used as a contextual basis for understanding SaaS application usage. In some implementations, a given platform application/service may be installed on-premise at the customer organization/entity. Examples of platform applications 122 include a single sign-on (SSO) service 124, a human resources (HR) management system 136, a finance application 128, an expense application 140, a contracts management application 132, and a networking service 144 (e.g. cloud access security broker (CASB)).

In some implementations, the SSO service 124 exposes an API 126, and a corresponding one of the platform connectors for the SSO service 124 is configured to obtain data from the SSO service using the API 126. A list of SSO-enabled applications can be obtained, as well as user login activity for each application, thereby providing broad visibility into the customer's SaaS application portfolio. By way of example without limitation, examples of SSO services include Okta™, Azure Active Directory™, Duo Security™, Idaptive™, OneLogin™, PingOne™, and Google Workspace™.

In some implementations, the HR management system 136 exposes an API 138, and a corresponding one of the platform connectors for the HR management system 136 is configured to obtain data from the HR management system 136 using the API 138. The customer's org chart data can be obtained from the HR management system 136, identifying the reporting structure and various organizational groups within the customer organization. Org chart data can be useful in enabling understanding of SaaS application usage and trends and distinguishing how they vary by team, location, and manager. Examples of HR management systems include Workday™, OneLogin™, Okta™, Azure Active Directory™, and Google Workspace™.

In some implementations, the finance application 128 exposes an API 130, and a corresponding one of the platform connectors for the finance application 128 is configured to obtain data from the finance application using the API 130. Payments data from the finance application 128 can be useful for discovering SaaS applications that are not otherwise known, and may not be managed by the customer's information technology (IT) department. Examples of finance application 128 include ERP systems such as Netsuite™ and Oracle™.

In some implementations, the expense application 140 exposes an API 142, and a corresponding one of the platform connectors for the expense application 140 is configured to obtain data from the expense application using the API 142. As with the payments data noted above, expense data from the expense application can also be useful for discovering SaaS applications that are not otherwise known, and may not be managed by the customer's information technology (IT) department. Examples of expense application 140 include Concur™ and Expensify™.

In some implementations, the contracts management application 132 exposes an API 134, and a corresponding one of the platform connectors for the contracts management application 132 is configured to obtain data from the contracts management application using the API 134. Contracts data can be used to provide visibility into license levels and contract spend, enabling recommendations for rightsizing and renewing licenses, as well as reclaiming unused licenses. Examples of contract management applications include Coupa™ and Ironclad™.

In some implementations, the networking service 144 exposes an API 146, and a corresponding one of the platform connectors for the networking service 144 is configured to obtain data from the networking service using the API 146. In some implementations, the networking service 144 is defined by a cloud access security broker (CASB) or other service/application that serves as a security enforcement point between the customer organization/entity and its SaaS applications or other cloud services. Data obtained from the networking service 144 provides another source for discovering applications through user logins and use over network activity.

It will be appreciated that the platform connectors 104 can be configured to automatically update data over time, for example, periodically pulling data from the relevant sources. In this manner, customer-specific contextual data for understanding SaaS application usage is continually maintained and tracks the current state of the customer organization. The data obtained from the customer's platform applications 122 is stored in the SMP 100 as platform data 108. While platform connectors 104 enable automatic retrieval of data directly from the customer's platform applications/services, it will be appreciated that, in the alternative, a given customer may upload their platform application data to the SMP 100.

The engagement connectors 106 are configured to obtain data pertaining to usage of the customer's SaaS application portfolio 148. For example, a given SaaS application 150 may expose an API 152, and a corresponding one of the engagement connectors 106 for the SaaS application 150 is configured to call the API 152 to obtain data describing events that occurred through customer usage of the SaaS application 150. Likewise, a given SaaS application 154 may expose an API 156, and a corresponding one of the engagement connectors 106 for the SaaS application 154 is configured to call the API 156 to obtain data describing events that occurred through customer usage of the SaaS application 154. It will be appreciated that there can be many SaaS applications in the customer's SaaS application portfolio 148, and each may expose an API that is called by a corresponding engagement connector to obtain data describing events occurring through usage of the applications. Such data is stored in the SMP 100 as SaaS app event data 110.

As described in further detail below, the SaaS app event data 110 is processed and analyzed to determine various aggregations and information describing the customer's usage of their SaaS application portfolio 148, which is stored as customer usage data 112. Such usage data can be accessed for viewing via a client device 114 operated by a user 118 (e.g. an employee of the customer organization viewing the usage data of the customer organization). By way of example without limitation, examples of client devices include personal computers, laptops, tablets, cellular phones, mobile devices, etc. In some implementations, the SMP 100 is accessed via a browser or application executed by the client device 114, and the customer usage data 112 is provided for viewing through the browser/application.

In the present disclosure the terms "application" and "app" are used interchangeably. Generally, an "app" refers to a SaaS application that is capable of being managed through the SMP.

Methods and systems are described which enable an SMP to efficiently and accurately match expenses submitted to employers for reimbursement to software applications. The method includes acquiring supplementary information about the person who is expensing from additional systems, deriving additional information about the expenses, and using machine learning to match in a way that balances efficiency and accuracy. An expense record resolution system is herein described to implement such a method.

Figure 2:
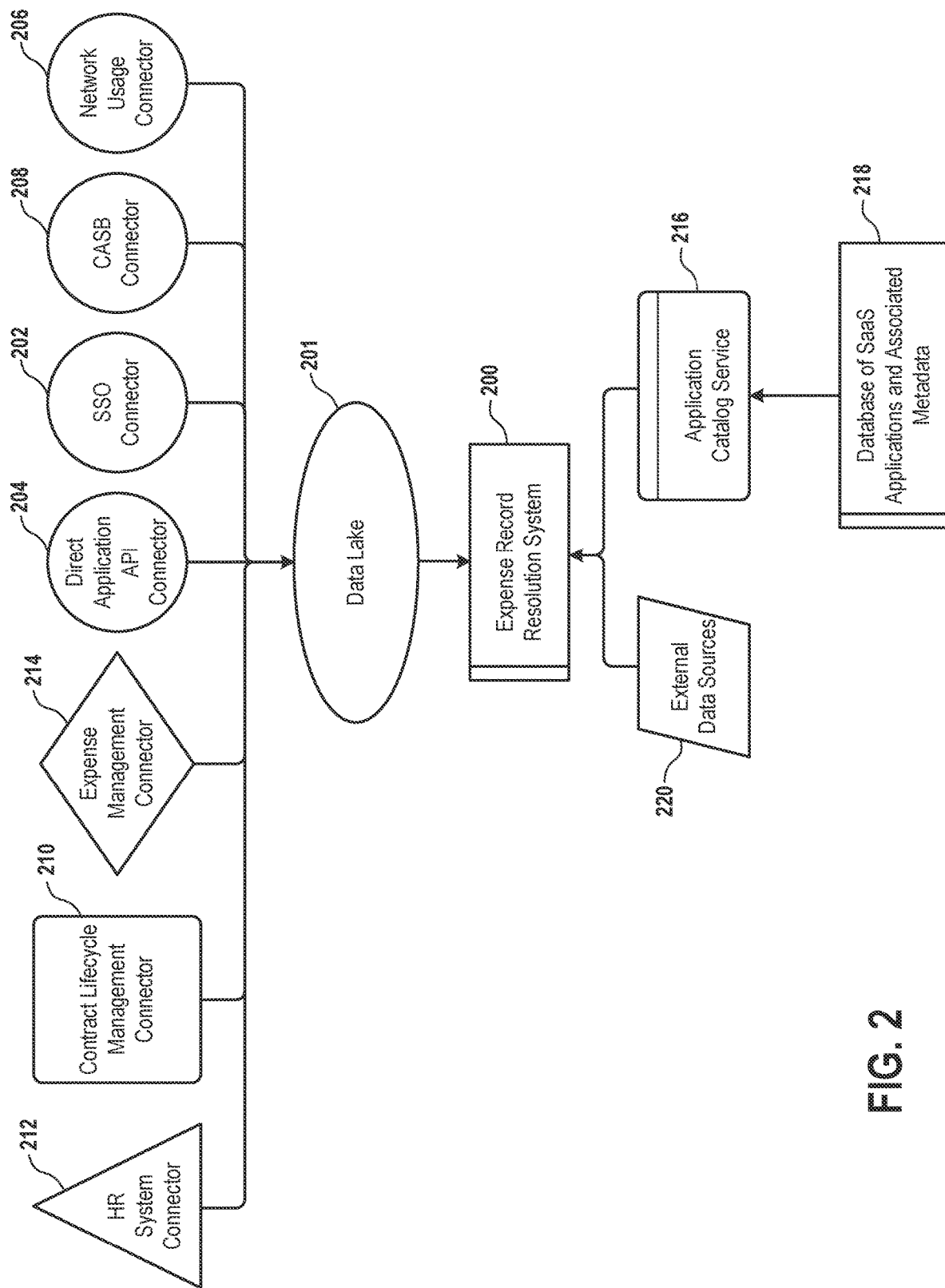
FIG. 2 conceptually illustrates various data sources which are leveraged by an expense record resolution system, in accordance with implementations of the disclosure.

FIG. 2 conceptually illustrates various data sources which are leveraged by an expense record resolution system, in accordance with implementations of the disclosure.

The expense record resolution system 200 is a component of the SMP 100 that is configured to determine, for a given expense record, whether the expense record is for a software purchase, and if so, for which specific software application. To accomplish this, the expense record resolution system 200 leverages a wide variety of additional data obtained from systems to which the SMP has access. As noted, the SMP 100 of the present disclosure provides a robust data system that integrates with a variety of data sources, and then sorts and aggregates the raw data into schematized data types and systems for the expense record resolution system 200 to use.

Broadly speaking, the various data types applied by the expense record resolution system 200 include engagement data, expense data, contract data, and HR data. The following is a description of the data types as well as the canonical sources of these data types.

Engagement data describe if/how an employee is interacting (engaging) with an application. Engagement data is obtained from several different sources using various connectors.

SSO (Single Sign On) connectors 202 obtain events every time an employee logs into an application via an SSO log-in flow. SSO connectors 202 are configured to integrate with SSO provider API endpoints (e.g. signing into Jira™ via Okta™ will record an event, indicating that the employee uses Jira™).

Direct application connectors 204 are integrations into individual applications' API endpoints. These integrations provide deeper insights into an employee's engagement with an application, allowing visibility regarding not only their use of an application, but what specific features and actions they take within the application (e.g. Zoom™ direct connectors provide the ability to see when an employee starts a Zoom™ meeting, sends a message in chat, etc.), with whom the employee interacts with (e.g. which other employees) when using the application, etc.

Network usage connectors 206 surface network activity from a specific employee, through which it is possible to determine what applications an employee is using. These can come from multiple sub-sources, including the following: (i) browser extensions that monitor all the websites that a user visits provide insight into a users' activity, from which it is possible to resolve some of these visits to applications and further determine engagement with an application; (ii) CASB connectors 208 are integrations with Cloud Access Security Brokers (CASB) systems that provide employee's network usage data, and this data is parsed to determine what network requests can be routed and mapped to software applications, which is used as a record of "engagement" with an application (e.g. for an employee using app.productiv.com, it can be inferred that they are using Productiv™); (iii) Mobile Device Management (MDM) connectors are integrations with device management systems, which can provide network level data across an entire employee machine/device enabling not only tracking online web-based software products, but also local software products that employees may download onto their machines directly.

Contract data is a significant source of information leveraged by the SMP to help customers optimize their expenditure on software. The SMP 100 ingests a large swath of data files (e.g. PDF files) that represent contractual agreements between application vendors and customers of the SMP. These files include data such as cost per license, number of licenses purchased, features of the application, term duration, etc. Such contracts are uploaded via two different sources: (i) Contract Lifecycle Management (CLM) connectors 210 are integrations with contract storage systems (e.g. Box™, Dropbox™, etc.), and these CLM connectors 210 directly ingest the contract files stored in these systems into the SMP's data system; (ii) alternatively, customers will often manually upload their contract files directly to the SMP's system. HR data provides a significant understanding of the software that customers (and employees) of the SMP use, through a strong understanding of the employees that are using the software. HR data is obtained through HR system connectors 212, which are typically integrations with enterprise identity management systems (e.g. AzureAd™, Okta™, Auth0™, etc.), but alternatively can also be shared via direct CSV uploads. HR data provides information such as what an employee's job title is, who they report to, what organization they work under, where they are based, etc. These fields provide a better understanding of the employee who is submitting a given expense, which enables improved filtering of suggested mappings (as described in further detail below).

Naturally, expense data is at the core of the expense resolution system. These are employee-submitted expense records, which are run through the resolution system to determine whether they can be resolved to a software application, and if so, which one. Expense data can be obtained using an expense management connector 214 that provides an integration with an expense management system (e.g. Expensify™, SAP Concur™) or from a direct CSV upload.

In some implementations, the data obtained using various connectors as described above are collected by the SMP 100, and such data can be collectively referred to as a data lake 201. It will be appreciated that the data lake 201 can include any of the data previously described as platform data 108, SaaS application event data 110, and customer usage data 112. Broadly speaking, the data lake 201 includes application and customer related data that customers have authorized the SMP 100 to obtain (e.g. via connectors), or data that customers have provided directly to the SMP (e.g. via direct upload).

In addition to the above data sources, the expense record resolution system 200 also integrates with an Application Catalog Service (ACS) 216, which in some implementations can be an internal service that is part of the SMP 100. The ACS provides access to a database 218 of software applications, with associated metadata providing additional data points for each of those applications. Examples of such additional data points include application features, cost per seat, and any other relevant details that are specific to an app. These features are useful as part of the expense resolution process, as described in further detail below.

External data sources 220 encompasses any external data source used for expense resolution, from location services to application review sites. These are used to augment the existing data (e.g. using location services+users' location from HR data+the vendor name from an expense record to determine if there's a restaurant in the area with that name) and increase the robustness of the resolution service.

The above-described data sources are utilized to improve the efficiency and accuracy of the expense resolution process through intelligently automating the resolution of expenses to software applications. More specifically, the disclosed techniques receive data from multiple systems, such as those presently described, about what applications the user is using and derive new information about the potential set of applications that the user may be interested in using. The disclosed techniques allow the system to learn the probability that an expense is a software expense and the likelihood of it being a particular software product.

In some cases, the disclosed techniques train a neural network classifier to determine the classification. To train the neural network classifier, the disclosed techniques receive training data comprising a plurality of data sources and whether or not the expense has been resolved correctly to the right software product. The disclosed techniques compute a deviation between the estimated match and the ground truth and update the parameters of the neural network classifier based on the computed deviation.

In this way, the disclosed techniques can select and automatically match each expense to the right application or discard it as irrelevant. This improves the overall experience of the user in that they have a complete portfolio of applications that users have paid for and reduces the overall amount of system resources needed to accomplish a task.

Figure 3:
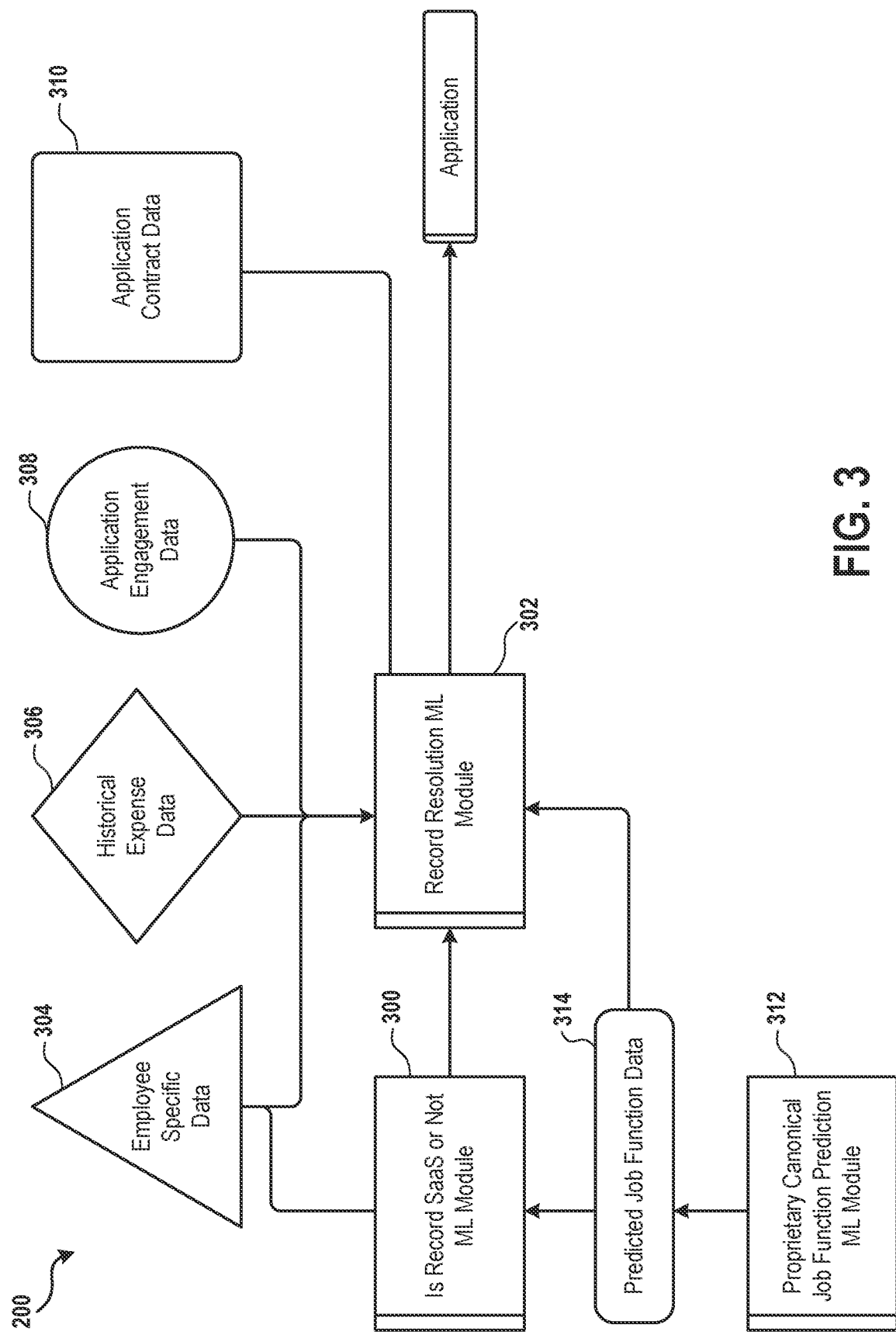
FIG. 3 conceptually illustrates components of the expense record resolution system (ERRS) 200, in accordance with implementations of the disclosure.

FIG. 3 conceptually illustrates components of the expense record resolution system (ERRS) 200, in accordance with implementations of the disclosure.

The ERRS 200 is configured to leverage several types of data as described above, that relate to a given expense record, in order to identify whether the expense record is for software, and if so, resolve which particular software application. By way of example without limitation, these various types of data can include data received via connectors as described above or other mechanisms, and may include employee specific HR data 304, historical expense data 306, application engagement data 308, and application contract data 310.

Additionally, a job function ML module 312 generates predicted job function data 314 for use by the ERRS 200. It will be appreciated that a given employee's role, position or job function within their company/organization is useful information for resolving a given expense record. However, different companies may use different terminology to describe similar or the same roles. Accordingly, the job function ML module 312 serves to normalize the name of the employee's role to a normalized job function which is predicted by the ML module 312, and provided as predicted job function data 314 for use in resolving the expense record.

Broadly, the ERRS 200 employs a two-step process for resolving expense records using two different machine learning (ML) modules. A first ML module 300 is configured to determine whether or not a given expense record represents a software purchase of some kind, without regard to which particular software title might be purchased. If the first ML module 300 determines that the given expense record is for software, then a second ML module 302 determines which particular software application or software title is referenced in the given expense record.

Rather than using a singular model to attempt to resolve an expense record directly to a specific software application, the implementation of a two-step process in ERRS 200 provides enhanced flexibility of the system. This is due in part to the fact that the body of available software applications in the world is growing and changing over time. Accordingly, the catalog of applications described above will tend to be incomplete, and may not include applications which have only recently been released. Hence it may not be possible for the ERRS to actually resolve a given expense record to a specific application if the system does not yet possess information about that specific application. However, though resolution to a specific application might not be possible, it can still be possible to determine with a high degree of confidence whether the given expense record is for software or not. Such information is still useful for the customer of the SMP to know, as it helps the customer understand their costs, and does represent a portion of their total spend on software.

It will be appreciated that determining whether an expense record is for software or not is a different problem than determining which particular software application is being purchased. Accordingly, the first ML module 300 and the second ML module 302 are optimized in different ways, though they both may utilize the same sets of data.

In some implementations, the first ML module 300 is defined by a neural network classifier trained to determine a binary classification of whether a given expense record does or does not represent a software purchase. In some implementations, the neural network classifier is trained using labeled training data including expense records and related data from a plurality of data sources and labeling of whether or not the expense record was for software. In some implementations, training entails computing a deviation between the estimated match and the ground truth and updating the parameters of the neural network classifier based on the computed deviation.

Several examples are now described, illustrating various kinds of data considered and principles for distinguishing between software and other expenses which may be learned by the ML module 300.

Restaurant expenses are often company location specific (with the exception of expenses at chain restaurants). Hence the system may determine whether an expense is for a restaurant or local business or software by using data on the location of users expensing an item. If all the expenses for a vendor are from co-located users, it increases the probability of the vendor being a local business, and therefore a non-software expense.

Software applications being expensed are rarely exclusive to one company. Accordingly, how often people in different companies (across the plurality of customers of the SMP) filed for an expense may help predict whether or not an expense is a software expense.

The frequency, size, and variability of expenses can be indicative of whether an expense is for software. For instance, expenses that are very frequent may be less likely to be software expenses, as in many cases, software licenses are typically granted for a one-year term with renewals occurring annually. Also, more variable expense amounts for a given vendor may suggest that the vendor is likely not selling software.

Matching browsing and networking data to expense descriptions enables the system to leverage data from user behavior. For example, if an employee expensed 'catch' and also went to catchrestaurants.com, and there is no record of the employee browsing the catch app website, then this may indicate that the expense is more likely to be for a restaurant and not software. Hence, signals from browsing and networking data can be used to learn if an expense was for an application or something else such as a restaurant in this example.

In some instances, there may be data available on what the conventional expense amount is for apps like catch. For example, such data may be available from previously seen high-fidelity expenses that other employees at this company or other companies have submitted. Thus, matches can be prioritized based on similarity to such previous expenses.

It will be appreciated that the foregoing examples are intended to illustrate, by way of example without limitation, the kinds of data considered and principles for distinguishing between software-related expenses and non-software related expenses, utilized in accordance with implementations of the disclosure. These and other types of data can be considered by the first ML module 300 to determine the nature of a given expense record. And the first ML module 300 may embody the foregoing as well as other principles, which can be learned by the ML module 300 through a training process using labeled training data.

In some implementations, the second ML module 302 is defined by a neural network classifier trained to determine a classification of a given expense record as for a specific software title. In some implementations, the neural network classifier is trained using labeled training data including expense records and data from a plurality of data sources and whether or not the expense has been resolved correctly to the right software product. In some implementations, training entails computing a deviation between the estimated match and the ground truth and updating the parameters of the neural network classifier based on the computed deviation.

Several examples are now described, illustrating various kinds of data considered and principles for distinguishing between software applications (e.g. which "apollo" software did the user expense), which may be learned by the ML module 302.

Expense data is variable in quality. But by leveraging higher quality data, the system can learn attributes of different software more reliably (e.g. the average cost of a piece of software, etc.). In some implementations, a quality score for an expense is determined using attributes such as completeness. This additional data can be used to correctly match lower-quality expense data. For instance, from good-quality data, it may be learned that Github™ costs $7/mo./user and Growthhub™ costs $100/mo./user. And thus, when an expense called 'GH' and $7 expense is encountered, the system may be likelier to match the expense to Github™.

Data about who is expensing a given item can be useful in resolving which software is being expensed. For example, if an engineer is expensing, "gh" is likely GitHub™ instead of growthHub™ (a marketing app). In this case, the system may determine who is an engineer using HR data and how they engage with different applications.

Data on interactions may be relevant to determining which software is the correct match for an expense. For instance, for an expense submitted by an engineer interacting a lot with a designer (e.g. as determined via data such as slack message logs), the system may be likelier to map a record called 'fima' to 'Figma'™

Data from single sign-on systems such as Okta™ indicate which applications users log into, which can be useful in assessing an expensed application. For example, if the user is engaging with 'Zoominfo'™ and there is no engagement on "Zoom,"™ it may be likelier that an expense called 'zoom' maps to Zoom™.

Historical expense data can provide insight regarding proper matching of an expense to an application. For example, if many people at the company have expensed Zoom™ before, it may be likelier that the next expense called 'zoom' is also for Zoom™.

Potential apps can be filtered on the basis of known device information. For example, the operating system being used by the user's device can be inferred from device management data connectors and used to filter down to apps that are only available for that operating system.

Understanding app related data from peers of the user can be useful in resolving an expense. For example, understanding how many peers (which can be defined as 'functional peers'—e.g. across customers, how many fellow 'engineers'+people the user regularly interacts with) of the user have expensed the app, may be indicative of the user's likelihood of also expensing the app.

The user's web traffic can be indicative of an app. For example, visits by the user to the app website or the app competitors' websites may make it likelier that an expense by the user is for the app.

The popularity of an app over time can be useful in resolving an expense record. For example, apps which are rising in popularity are likelier to be matched than those on a downward trend.

It will be appreciated that the foregoing examples are intended to illustrate, by way of example without limitation, the kinds of data considered and principles for determining which particular software title a given software-related expense is for, utilized in accordance with implementations of the disclosure. These and other types of data can be considered by the second ML module 302 to match a given expense record to a known software application. And the second ML module 302 may embody the foregoing as well as other principles, which can be learned by the ML module 302 through a training process using labeled training data.

Figure 4:
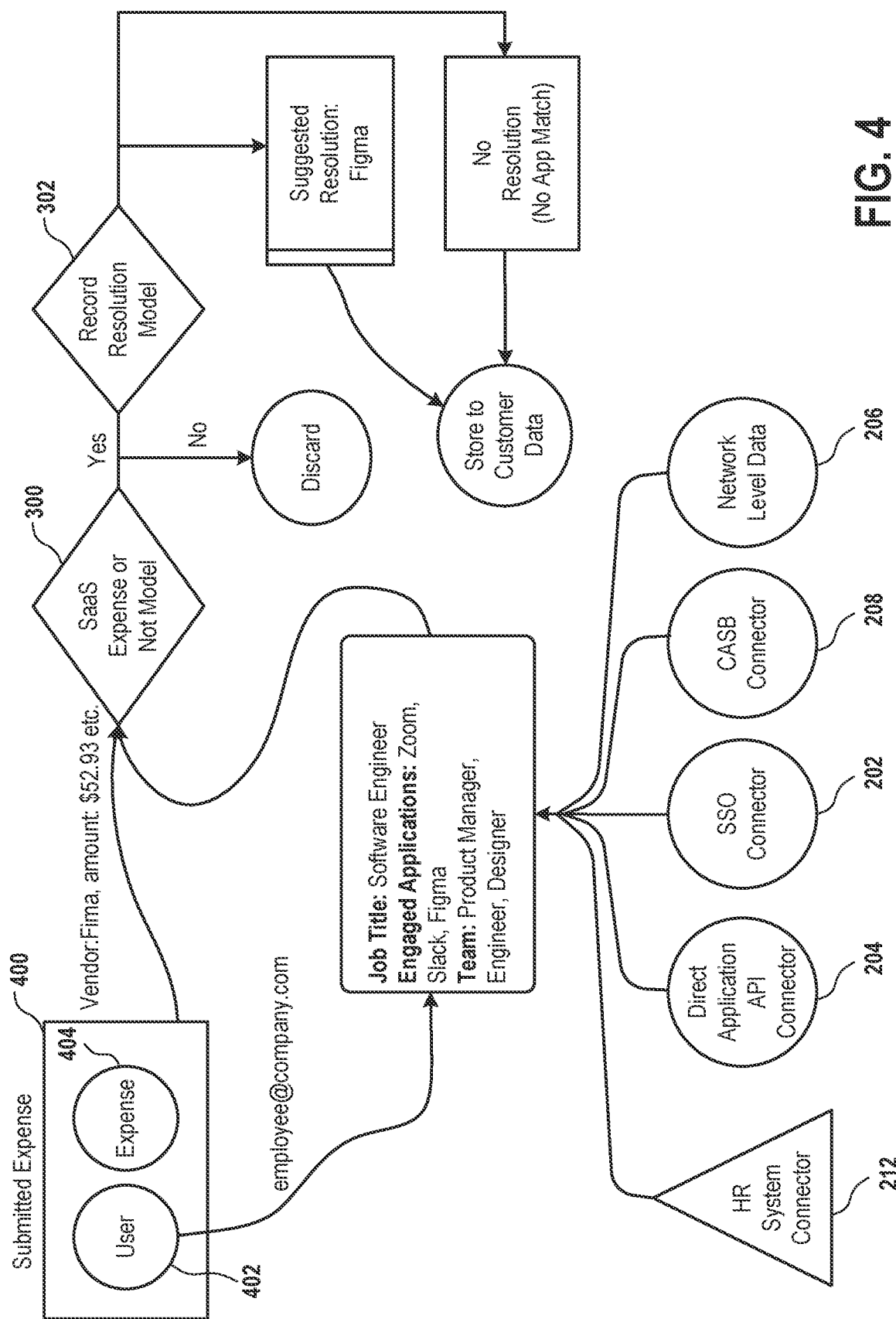
FIG. 4 conceptually illustrates a process for resolving an expense record, in accordance with implementations of the disclosure.

FIG. 4 conceptually illustrates a process for resolving an expense record, in accordance with implementations of the disclosure.

An expense record 400 is submitted for resolution by the system. The Expense record 400 includes a user identifier (ID) 402 which uniquely identifies the user/employee who submitted the expense (e.g. employee's name, e-mail address, avatar name, employee number, etc.). The expense record 400 also includes expense data 404, which identifies the amount that was expensed and what the expense was for (e.g. vendor or business name, product, etc.), and may further include additional information about the expense, such as the date of the expense, a category for the expense, a project name, an event name, etc.

Using the data available from the expense record 400, the system pulls additional data that is available to the SMP, including data obtained via the various connectors previously described, such as connectors 212, 204, 202, 208, and 206 as shown in the illustrated implementation. For example, for a given user ID 402, the system may obtain the employee's job title and the team(s) they belong to from the HR data. Furthermore, the applications that the user currently engages with can be obtained from the engagement data for the user's company/organization. It will be appreciated that many other types of data relating to the user and their application engagement can be obtained, including any of the other types of data which are identifiable for a given user that is an employee of a customer of the SMP.

The expense record 400 and the additional data obtained as described above, are submitted to the first ML module 300 (e.g. a "SaaS expense or not" model), which determines whether the expense record 400 describes a purchase for software. If not, then the record is discarded and the process ends. If so, then the expense record 400 and the additional data are then submitted to the second ML module 302 (e.g. a "record resolution" model) which attempts to resolve the expense record to a specific known application. The result will be either a suggested resolution that identifies a specific application known to the system, or a result indicating that no resolution was found (i.e. no app was found to be a sufficient match to be identified by the model). In either case, the results are stored as part of the customer's data in the SMP. If no known application is identified, then the expense is identified in the customer's data as part of the customer's spend on unrecognized software; whereas if a known application is identified, then the expense is identified as part of the customer's spend on the known application.

It will be appreciated that in some instances, the expense will map to an application that was previously unknown as being used by the customer organization, and in this manner the SMP's ability to provide insight for a given customer regarding their application usage is improved. Such an application might be unknown to the customer's IT department, and therefore by uncovering the application through automated expense record analysis as presently described, the customer's IT department is better able to understand and manage their application spend and usage. And even if the system is not able to identify the specific application, but nonetheless identifies the expense record as pertaining to software, such information is useful for the customer organization and enables them to understand software spend that might otherwise be unrecognized.

Figure 5:
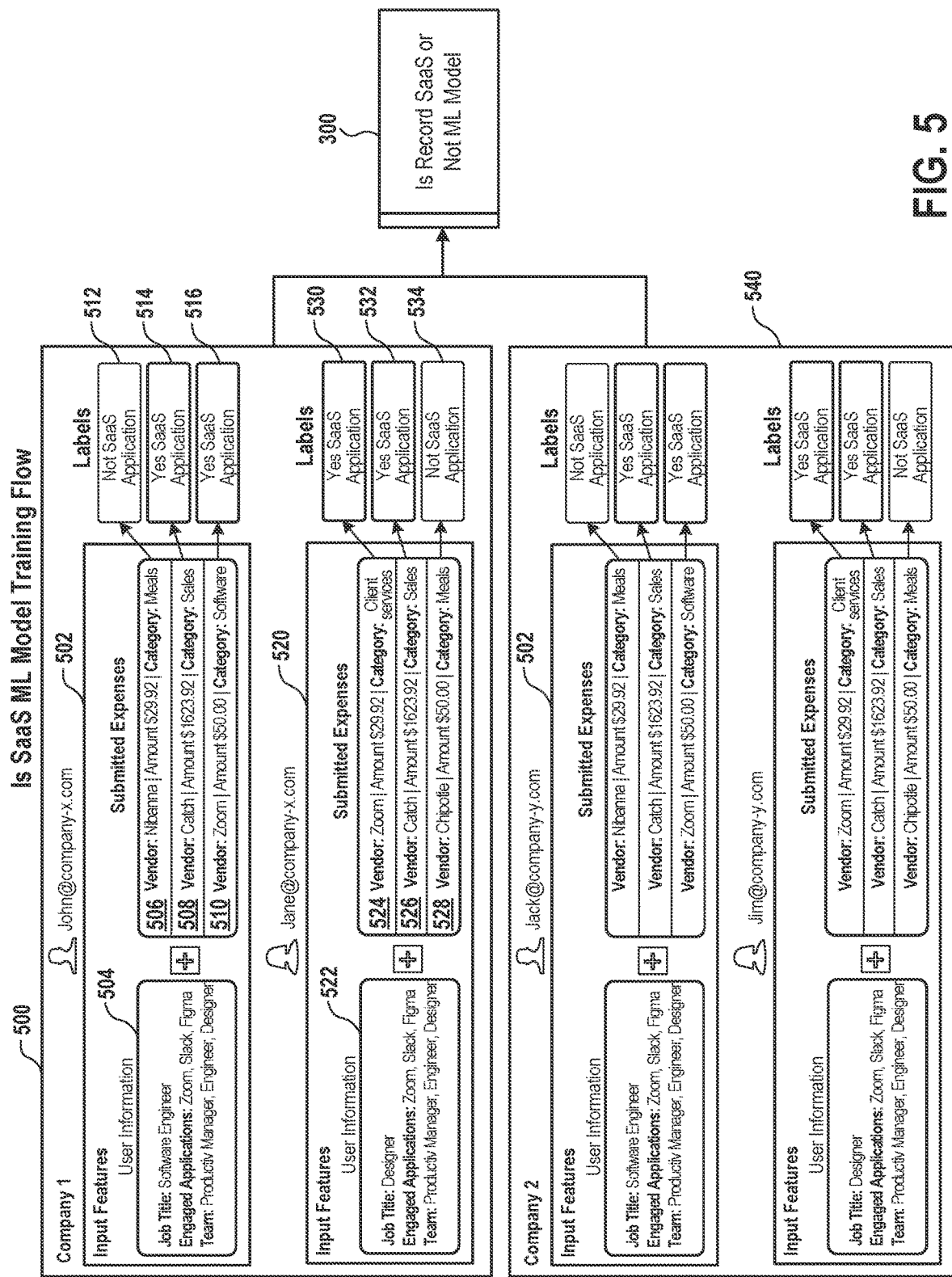
FIG. 5 conceptually illustrates a process for training an ML model to determine whether a given expense record is a software expense or not, in accordance with implementations of the disclosure.

FIG. 5 conceptually illustrates a process for training an ML model to determine whether a given expense record is a software expense or not, in accordance with implementations of the disclosure.

To train the ML model 300, a set of labeled training data is provided and used to perform the training. That is, individual expense records are labeled as being for software or not (e.g. for SaaS or not). In the illustrated implementation, it will be appreciated that the SMP 100 has many customer companies, and each company has various employees that submit expense records. Hence, the training data can include labeled expense records from across many companies, and thereby provide a robust training set for the model.

For example, in the illustrated implementation, a first company 500 includes an employee 502 who has submitted various expense records 506, 508, and 510. These expense records have been labeled with corresponding labels 512, 514, and 516, respectively, indicating whether they are for software (e.g. SaaS) or not. The labeled expense records are combined with user information 504, which can include any of the above-described types of data about the employee 502, such as HR data, user engagement data, or other user-related data obtained through the various connectors or uploaded by the customer as previously described. The user information 504 may further include any data that relates to the company 500 which may be relevant for the model's purpose, as previously described, such as historical expense data, application engagement data, contract data, etc.

The first company 500 further includes another employee 520 who submitted expense records 524, 526, 528, which are labeled with labels 530, 532, 534, respectively, indicating whether they are for software (e.g. SaaS) or not. And these are combined with user information 522, similar to that described above. It will be appreciated that the first company 500 may have many other employees with labeled expense records and corresponding user information that are used to form the training data for the ML model 300.

The above-described examples of training data are provided by way of example without limitation, and as such are merely a representative sample of the kinds of input data and probabilistic labels that can be used in a process for training an ML model in accordance with implementations of the disclosure.

Furthermore, as the SMP can have many customers, the training data can include labeled records of many other companies, such as a company 540 in the illustrated implementation. The training data, including labeled expense records and user information, is used to train the ML model 300. In some implementations, the ML model 300 is defined by a neural network classifier, and the training data is used to train the neural network classifier to classify a given expense record as an expense for software or not for software. In some implementations, the training entails computing a deviation between the neural network classifier's predicted result for a given expense record and the labeled result, and updating the parameters of the neural network classifier based on the computed deviation.

It will be appreciated that a similar process to that described above for the ML model 300, can be employed for training of the ML model 302 to identify which particular software application a given expense record is for.

It will be appreciated that the SMP can have many customers, whose expense data, engagement data, HR data, contract data, etc. may be used to train the ML models as presently described. However, customer data security and privacy is a critical concern for an SMP, and accordingly, measures are taken to ensure that customer data maintained in a secure fashion. To begin with, customer data is encrypted and access to customer data is restricted via login/authentication systems so that only employees of a given customer may access the customer's data. Furthermore, additional employee access controls can be implemented so that only certain employees may access certain data of the customer on the SMP.

With respect to the expense resolution systems and ML models of the present disclosure, it will be appreciated that though an ML model may be trained using customer data across various customers, the use of such a trained ML model in and of itself does not reveal any customer-specific data. Furthermore, the training data can be anonymized so that no identifying data is included (e.g. replacement of customer-specific employee id's with anonymized id's, replacement of customer specific job function names with normalized job function names, removal or replacement of customer-identifying information, etc.). These and other measures can be taken to ensure that customer data security is maintained, while enabling the SMP to provide features leveraging data across multiple customers.

FIG. 6 illustrates a user interface showing an app portfolio listing for a customer of an SMP, in accordance with implementations of the disclosure.

More specifically, discovered applications resolved using the systems described herein are shown in the illustrated view. The illustrated user interface 600 is configured to provide a customer (e.g. an authorized employee of the customer or other authorized user of the SMP) of the SMP with access to view their app portfolio, including certain information such as how many apps the customer has in their portfolio, and how much the customer has spent on the apps. Apps can be filtered to show specific ones used by selected teams or employees, and access to further engagement data is enabled through the interface. In the illustrated implementation, filters 602 are applied to enable display of apps which have been discovered from the customer's expense data. And thus, apps which were resolved from the customer's expense records using systems in accordance with implementations of the disclosure are surfaced in the listing 604. In this manner, the customer (e.g. the customer's IT department or other authorized employee) is able to easily view their apps which were discovered through expense data.

FIG. 7 illustrates a user interface showing expense records which have been resolved to a given application, in accordance with implementations of the disclosure.

In the illustrated implementation, the user interface 700 is configured to provide a customer with access to view data pertaining to a given one of the apps within the customer's portfolio on the SMP. In the illustrated implementation, the interface is displaying information about an app titled "Sales App." Various information such as the teams using the app, the feature-level engagement, contract data, etc. amount spent on the app can be provided. In the illustrated implementation, a "Past spend" tab 702 is selected, and accordingly in a section 704, a chart illustrating previous spend on the app by month is displayed.

Additionally, below section 704 in a section 706, individual expense records which represent spend on the app are shown. That is, expense records which are resolved to the app "Sales App" using the expense resolution systems of the present disclosure will appear in this section of the interface. The illustrated interface thus provides another mechanism whereby spend discovered through automated analysis of expense records can be surfaced to the customer.

FIG. 8 illustrates a user interface showing expense records identified as software spend, but not resolved to specific software applications, in accordance with implementations of the disclosure.

As noted above, in some instances, a given expense record may be identified by the system as a spend on a SaaS application, but the specific SaaS application may not be identified. The illustrated user interface 800 provides viewing of a "Review of hidden merchants." And more specifically, the listing in the interface shows unmapped records which have been identified as SaaS applications, but not resolved to any application by the expense resolution system. Via the illustrated interface, a customer of the SMP can view and discover such merchants and the corresponding amounts spent.

It will be appreciated that unrecognized apps provide an opportunity for the SMP to expand its app catalog. For example, unrecognized apps may be flagged for review by a designated person/team of the SMP. In some implementations, the interface 800 may facilitate feedback from the customer to the SMP, for example, to request a discovered merchant to be added to the SMP's app catalog, or to map an unrecognized merchant to an existing app (that is already in the SMP's app catalog). In some implementations, additional input interfaces can be provided for enabling such feedback to be provided to the SMP.

In one configuration, the SMP includes compute and storage resources for management of SaaS applications. As described above, a web user interface (UI) can be provided to enable remote client devices to use and access services of the SMP. In some implementations, at least some code integrated with the UI is configured to make API calls to the SMP to access data, compute and storage resources. In one embodiment, the compute and storage resources which run the SMP are run in a cloud-based environment. The cloud-based environment, for example, may be provided by a cloud compute and storage servicing entity, e.g., such as Amazon Web Services (AWS)™, Google™ Cloud, Microsoft™ Azure™, or other serving entities. In some configurations, hybrid cloud systems may be used, wherein some processes are executed by a cloud compute and storage servicing entity and other processes are serviced by private servers and storage or a private cloud. In still other embodiments, the processing can be executed entirely on private services and storage or private cloud configuration. In some embodiments, the servicing entities are referred to as hosting services, which provide the hardware and internet connectivity to execute applications, processes, and workflows using various types of hardware configurations.

In some configurations, data that is retrieved from the various SaaS entities using APIs or other accessing code can be stored in one or more databases that make access and further processing more efficient. By way of example, a relational database may be executed for storing data, retrieval of data, and manipulation (e.g., processing) of data. In one embodiment, the database may use a structured query language (SQL) as the programming language that is used to manage relational database data and perform various operations on the data in them. Without limitation, sometimes databases may be referred to as relational database management systems (RDBMS), relational data stream management systems (RDSMS), or simply a database. Generally, relational databases are particularly useful in handling structured data, i.e., data incorporating relations among entities and variables, such as data obtained and processed by an SMP. It should be understood that other database standards or protocols can be used, so long as the processing of SaaS data can be performed for rendering benchmarking and analytics and/or presentation tasks.

In some configurations, the hardware configurations may include virtualized hardware and expandable storage to meet the processing needs of the SMP. Broadly speaking, the SMP is executed using cloud infrastructure, which includes the use of one or more multiple interconnected data centers throughout the world. Based on the load demands for servicing the SMP, the resources may be expanded.

It should be apparent that the present embodiments may be practiced without some or all of these specific details. Modification to the modules, code and communication interfaces are also possible, so long as the defined functionality for the SMP or modules of the SMP is maintained. In other instances, well-known process operations have not been described in detail in order not to unnecessarily obscure the present embodiments.

One or more embodiments can also be fabricated as computer-readable code on a non-transitory computer-readable storage medium. The non-transitory computer-readable storage medium is any non-transitory data storage device that can store data, which can thereafter be read by a computer system. Examples of the non-transitory computer-readable storage medium include solid state drives (SSDs), hard drives, network attached storage (NAS), read-only memory, random-access memory, persistent memory, CD-ROMs, CD-Rs, CD-RWs, magnetic tapes and other optical and non-optical data storage devices. The non-transitory computer-readable storage medium can include computer-readable storage medium distributed over a network-coupled computer system so that the computer-readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

While the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

The invention claimed is:

1. A non-transitory computer-readable medium having program instructions embodied thereon that, when executed by at least one server computer, cause said at least one server computer to perform a method implemented in a Software as a Service (SaaS) management platform (SMP), said method including the following operations:
   receiving a plurality of expense records for a customer organization, wherein each one of the plurality of expense records identifies a user, a vendor, and an amount spent;
   accessing an application programming interface (API) of a human resources (HR) SaaS application to obtain HR data of the users respectively identified by the plurality of expense records, the HR data identifying roles of the users;
   using a first machine learning model to analyze the plurality of expense records and determine which ones of the expense records represent software purchases;
   using a second machine learning model to analyze the expense records that are determined to represent software purchases, and identify software titles that the software purchases are for;
   wherein using the first or the second machine learning model is configured to analyze, for a given user identified by a given expense record, the role identified by the HR data of the given user; and
   surfacing the expense records that represent software purchases, in association with their respective identified software titles, through a user interface of the SMP for the customer organization;
   applying a third machine learning model to the roles of the users identified by the HR data to predict normalized job functions based on the roles of the users;
   wherein analyzing the roles of the users by the first machine learning model includes analyzing the normalized job functions in order to determine the expense records representing software purchases;
   wherein analyzing the roles of the users by the second machine learning model includes analyzing the normalized job functions in order to identify the software titles that the software purchases are for.

2. The non-transitory computer-readable medium of claim 1, wherein the HR data of the user identified by the given expense record includes one or more of a team, or a location of the user.

3. The non-transitory computer-readable medium of claim 1, wherein the method further includes:
   accessing application engagement data of the users respectively identified by the plurality of expense records;
   wherein using the first or the second machine learning model is configured to analyze, for a given expense record, the application engagement data of the user identified by the given expense record.

4. The non-transitory computer-readable medium of claim 3, wherein the application engagement data of the user identified by the given expense record identifies one or more applications that the user has interacted with.

5. The non-transitory computer-readable medium of claim 3, wherein accessing the application engagement data of the users includes accessing an API of a single sign on (SSO) service or a cloud access security broker (CASB).

6. The non-transitory computer-readable medium of claim 1, wherein receiving the expense records includes accessing an API of an expense management SaaS application.

7. The non-transitory computer-readable medium of claim 1, wherein the first or the second machine learning model is defined by a neural network classifier trained using labeled training data.

8. The non-transitory computer-readable medium of claim 1, wherein using the second machine learning model is configured to access an application catalog service that maintains a directory of software applications.

9. The non-transitory computer-readable medium of claim 1, wherein surfacing the expense records that represent software purchases through the user interface of the SMP includes, for a given software title, listing data from the expense records that represent software purchases for the given software title.

10. The non-transitory computer-readable medium of claim 1, wherein surfacing the expense records that represent software purchases through the user interface of the SMP includes, for a given software title, adding the amounts spent, of expense records representing software purchases of the given software title, to a total spend for the software title that is displayed in the user interface.

11. A non-transitory computer-readable medium having program instructions embodied thereon that, when executed by at least one server computer, cause said at least one server computer to perform a method implemented in a Software as a Service (SaaS) management platform (SMP), said method including the following operations:
   receiving a plurality of expense records for a customer organization, wherein each one of the plurality of expense records identifies a user, a vendor, and an amount spent;
   accessing an application programming interface (API) of a human resources (HR) SaaS application to obtain HR data of the users respectively identified by the plurality of expense records, the HR data identifying roles of the users;
   using a first machine learning model to analyze the plurality of expense records and determine which ones of the expense records represent software purchases;
   using a second machine learning model to analyze the expense records that are determined to represent software purchases, and for each expense record representing a software purchase, either identify a software title that the software purchase is for, or determining that a software title cannot be identified that the software purchase is for;
   wherein using the first or the second machine learning model is configured to analyze, for a given user identified by a given expense record, the role identified by the HR data of the given user; and
   surfacing the expense records that represent software purchases through a user interface of the SMP for the customer organization;
   applying a third machine learning model to the roles of the users identified by the HR data to predict normalized job functions based on the roles of the users;
   wherein analyzing the roles of the users by the first machine learning model includes analyzing the normalized job functions in order to determine the expense records representing software purchases;

wherein analyzing the roles of the users by the second machine learning model includes analyzing the normalized job functions in order to either identify, or determine cannot be identified, the software title that the software purchase is for.

12. The non-transitory computer-readable medium of claim 11, wherein the HR data of the user identified by the given expense record includes one or more of a team, or a location of the user.

13. The non-transitory computer-readable medium of claim 11, wherein the method further includes:

accessing application engagement data of the users respectively identified by the plurality of expense records;

wherein using the first or the second machine learning model is configured to analyze, for a given expense record, the application engagement data of the user identified by the given expense record.

14. The non-transitory computer-readable medium of claim 13, wherein the application engagement data of the user identified by the given expense record identifies one or more applications that the user has interacted with.

15. The non-transitory computer-readable medium of claim 11, wherein receiving the expense records includes accessing an API of an expense management SaaS application.

16. The non-transitory computer-readable medium of claim 11, wherein the first or the second machine learning model is defined by a neural network classifier trained using labeled training data.

17. The non-transitory computer-readable medium of claim 11, wherein using the second machine learning model is configured to access an application catalog service that maintains a directory of software applications.

18. The non-transitory computer-readable medium of claim 1, wherein the third machine learning model is trained on data identifying roles and job functions across a plurality of customers of the SMP.

19. The non-transitory computer-readable medium of claim 11, wherein the third machine learning model is trained on data identifying roles and job functions across a plurality of customers of the SMP.

* * * * *